United States Patent [19]

Haddad et al.

[11] 4,357,295

[45] Nov. 2, 1982

[54] PROCESS FOR ELIMINATING HAZE FROM ARTICLES MADE OF CELLULOSE ACETATE BUTYRATE

[75] Inventors: Theodore A. Haddad; Walter Kondig, both of Leominster; Richard A. Phillips, Acton, all of Mass.

[73] Assignee: Foster Grant Corporation, Leominster, Mass.

[21] Appl. No.: 286,402

[22] Filed: Jul. 23, 1981

[51] Int. Cl.³ .................... B29C 25/00; B29D 11/00
[52] U.S. Cl. ................................ 264/341; 264/1.3; 264/2.6; 264/343; 264/346; 252/170; 252/171; 8/519; 156/668; 536/65; 536/76
[58] Field of Search .................. 536/65, 76; 264/1.3, 264/2.6, 129, 134, 232, 341, 343, 346; 427/439, 161, 163, 164; 8/519; 252/170, 171; 156/668

[56] References Cited

U.S. PATENT DOCUMENTS

| | | | |
|---|---|---|---|
| 2,651,811 | 9/1953 | Coney | 264/341 |
| 2,790,727 | 4/1957 | Hilborn | 427/161 X |
| 4,245,991 | 1/1981 | Haddad et al. | 8/506 |

Primary Examiner—Michael R. Lusignan
Attorney, Agent, or Firm—Tatsuya Ikeda

[57] ABSTRACT

Removal of haze from plastic articles made of cellulose acetate butyrate, such as light polarizing sunglass lenses made of cellulose acetate butyrate and polyvinyl alcohol, is accomplished by immersing said plastic articles in a substantially water-free bath composition at least 70 weight percent of which comprises an active solvent and a carrier solvent, the former being methyl alcohol, ethyl alcohol, propyl alcohol, butyl alcohol, or any mixture thereof, and the latter being ethylene glycol, glycerol, tricresyl phosphate, butyl phthalate, or any mixture thereof. Preferred values of the relative proportions of the active solvent and the carrier solvent are in the range of 90–5 and 10–95 weight percent, respectively, and more preferably, 80–10 and 20–90 weight percent, respectively.

9 Claims, No Drawings

PROCESS FOR ELIMINATING HAZE FROM ARTICLES MADE OF CELLULOSE ACETATE BUTYRATE

BACKGROUND OF THE INVENTION

The present invention relates to a novel method of removing haze from plastic articles made of cellulose acetate butyrate, particilarly light polarizing sunglass lenses made of cellulose acetate butyrate and polyvinyl alcohol, which haze has been created during exposure of said plastic articles to humidity in the air or during dyeing processes.

In many plastic articles made of cellulose acetate butyrate, clarity or transparency of the article is very important and haze is undesirable or intolerable. This is particularly true in the case of light polarizing sunglass lenses comprising a central layer of oriented polyvinyl alcohol (PVA) and a substrate layer of cellulose acetate butyrate (CAB) on either side of the PVA layer. Light-polarizing sunglass lenses having said construction are very common and occupy a predominant share of the present market of the light-polarizing sunglass lenses (polarizing lenses, hereafter). Said type of polarizing lenses, however, has a disadvantage that after a long exposure to high humidity air, particularly at higher ambient temperatures, they tend to develop haze. This can take place during storage or transportation and is undoubtedly due to an interaction between water and the lens material. Haze development in the polarizing lenses can occur also during the dyeing process if a water based dye bath is used. Such haze development is obviously very detrimental to the value of the sunglass lens and if the haze is excessive, the lens must be discarded resulting in a substantial economic loss when the quantity is large. Of course, haze development is undesirable not only in the case of polarizing lenses, but also in the case of many other plastic articles made of CAB.

We have discovered that haze created in plastic articles made with CAB, including polarizing lenses, during exposure to humidity or during dyeing processes is not an irreversible impairment, but instead can substantially be removed by immersing such hazed articles in a substantially water-free bath composition at least 70 weight percent of which is a combination of an active solvent and a carrier solvent, the former being methyl alcohol, ethyl alcohol, propyl alcohol, butyl alcohol or any mixture thereof, and the latter being ethylene glycol, glycerol, tricresyl phosphate, butyl phthalate, or any mixture thereof, and the relative proportions between the former and the latter being in the range of 90-5 and 10-95 weight percent, respectively, and more preferably 80-10 and 20-90 weight percent, respectively.

The applicability of the haze removal method of this invention is not limited to the polarizing sunglass lenses made of CAB, but rather the method is generally applicable to plastic articles made of CAB where haze has been created due to water.

SUMMARY OF THE INVENTION

According to the method of this invention, haze created in plastic articles made of CAB such as light polarizing sunglass lenses during exposure to humidity or during dyeing processes can be removed by immersing said plastic articles in a substantially water-free bath composition at least 70 weight percent of which is a combination of an active solvent and a carrier solvent, the former being methyl alcohol, ethyl alcohol, propyl alcohol, butyl alcohol, or any mixture thereof, and the latter being ethylene glycol, glycerol, tricresyl phosphate, butyl phthalate, or any mixture thereof, and preferred values of the relative proportions between the former and the latter being in the range of 90-5 and 10-95 weight percent, respectively, and more preferably 80-10 and 20-90 weight percent, respectively. A preferred temperature range of the bath is 120°-190° F. and a more preferred temperature range is 130°-160° F. The immersion time is typically 10-30 minutes when the bath temperature is 130°-160° F., but of course it varies depending upon, inter alia, the bath temperature, the initial haze value of the plastic article, the final haze value desired, the depth of the hazy layer, presence or absence of a coating layer over the hazy CAB layer and the thickness and the chemical composition of the coating layer if one is present, and the chemical composition of the bath used.

DETAILED DESCRIPTION OF THE INVENTION

Cellulose acetate butyrate (CAB) is well known in the art. The term "plastic articles made of CAB" as used herein includes plastic articles made entirely of CAB, made of a mixed substance containing a substantial proportion of CAB, and those plastic articles wherein CAB or a CAB-containing substance constitutes a portion of the article, and which can develop haze during exposure to the humidity in the air or during dyeing processes, but CAB or the CAB-containing substance need not be at the outer surface of the plastic article, i.e. there may be a layer of coating on them and yet they may develop haze. According to the method of this invention, haze can be removed even when there is a coating layer on CAB or a CAB-containing substance. Thus, an example of the application of the method of this invention is to remove haze from hard-coated light-polarizing sunglass lenses comprising a central layer of polyvinyl alcohol (PVA) having iodine molecules entrapped therein and on both sides of it a substrate layer of CAB which in turn has a hard coat layer on its exterior surface. Typically, the PVA layer is 0.001 inch or less in thickness, and each CAB layer is 0.015 inch or less, and the hard coat layer is of the order of several microns. Typical examples of materials used for the hard coating include melamine-formaldehyde resin and polyethylene glycol dimethacrylate, but the particular chemical composition of the hard coating material is not critical for the purpose of this invention.

The term "sunglass lens" as used herein means an eye shield used in sunglasses. Usually it does not have refractive power.

The term "solvent" is used here in a loose sense; it is merely a liquid medium in which the plastic articles made of CAB are immersed.

The term "active solvent" is a component of the solvent bath which contributes primarily to the removal of haze from the plastic articles. It is methyl alcohol, ethyl alcohol, propyl alcohol or butyl alcohol, or any mixture thereof.

The term "carrier solvent" is a component of the solvent bath which by itself has much less haze removal effect than the active solvent, but when combined with the active solvent becomes conducive to the overall effect of the method of this invention. For example, where isopropanol, a species of the active solvent, is used as a sole constituent of the bath, and the bath is operated at 130°-160° F., plastic articles made of CAB tend to swell, which is undesirable or intolerable particularly in the case of sunglasses. Carrier solvent is ethylene glycol, glycerol, tricresyl phosphate, butyl phthalate, or any mixture thereof.

The term "third component" as used herein is any substance which constitutes a part of the liquid medium used in the method of this invention, but does not belong to the classification of either the active solvent or the carrier solvent defined above.

Haze is a measure of scattered light. Haze values of sunglass lenses reported herein are measured according to ASTM D-1003-61 "Standard Method of Test for Haze and Luminous Transmittance of Transparent Plastics". In the case of sunglass lenses, a haze value of three percent is a typical tolerance level. When the haze of a sunglass lens reaches about ten percent, the haze becomes quite obvious to the naked eye, whereas at three percent level the haze is hardly noticeable to an untrained observer.

Plastic articles made of CAB develop haze during exposure to the humidity in the air particularly at higher ambient temperatures. They develop haze also during dyeing processes. This is true when the dye bath is an aqueous system. Certain non-aqueous dye bath systems, such as a mixture of glycerol and ethylene glycol, maintained at about 175°-200° F., have an advantage that either the haze development during the dyeing process is minimal in comparison to the aqueous system or the haze is actually reduced. We have discovered that haze which has developed in the plastic articles made of CAB can be removed to a level of one percent or less by the method of this invention. Naturally, the larger the initial value of the haze, the longer it takes to reduce the haze to a desired final level. We discovered, for instance, that it is quite feasible to reduce the haze value of a hard-coated polarizing lens from eighteen percent to one percent within a relatively short period of time, namely, in the order of twenty minutes, according to the method of this invention without causing any undesirable side effect to the lens such as bleaching of the pre-existing dye or swelling of the lens. Absence of such undesirable side effects is important particularly in the area of sunglasses where aesthetic appearance of the lens is so crucial.

The term "propyl alcohol" as used herein includes normal- and iso-propanol. The term "butyl alcohol" includes butanol-1, butanol-2, 2-methyl propanol-1 and 2-methyl propanol-2.

A preferred temperature range to be used in this invention is 120°-190° F. Below 120° F., it takes too much time to remove the haze, whereas above 190° F., aforementioned undesirable side effects tend to become manifest. A more preferred temperature range is 130°-160° F., but obviously it varies depending upon, inter alia, the desired speed of processing, the initial haze value of the plastic article, the final haze value desired, the depth of the hazy layer, presence or absence of a coating layer over the CAB layer, the thickness and the chemical composition of the coating layer if one is present, and the chemical composition of the bath used.

A typical immersion time is ten to twenty minutes according to the method of this invention, but it varies depending upon the bath temperature and other factors including those mentioned above.

Regarding the composition of the bath, we discovered that when active solvent alone is used without the presence of carrier solvent, undesirable side effects tend to develop in the plastic articles made with CAB at the operating bath temperatures of this invention, such as softening, swelling and crazing of the material, and bleaching of the dye. On the other hand, if the concentration of the active solvent is too low, the haze removal effect becomes low. Thus, preferred values of the relative proportions of the active solvent and the carrier solvent are in the range of 90-5 and 10-95 weight percent, respectively, and more preferably 80-10 and 20-90 weight percent, respectively, but as explained below there may be present in the bath a third component or components up to 30 weight percent of the total bath composition without departing from the scope of the invention.

Although methanol is effective for removing haze, it tends to bleach out many dyes when haze removal is attempted for the plastic articles which have previously been surface dyed. Thus, in such a case, the other alcohols, namely ethanol, propanol, and butanol are preferred.

Regarding the carrier solvent, ethylene glycol and glycerol are water-soluble, whereas tricresyl phosphate and butyl phthalate are not. Thus, ethylene glycol, glycerol and mixtures thereof have an advantage that the post-immersion step of removing the solvent remaining on the plastic article becomes simple, namely, the article is rinsed with tap water and allowed to dry. Where glycerol alone is used as carrier solvent, however, haze removal proceeds rather sluggishly. Where ethylene glycol alone is used as a carrier solvent, there is a slight tendency for the polarizing lens made of CAB to swell, although such swelling usually disappears after about one day subsequent to the processing. Hence, it is preferable to use glycerol and ethylene glycol in combination.

Although ethylene glycol, glycerol, tricresyl phosphate, butyl phthalate and mixtures thereof work very nicely, when combined with the active solvent, to suppress the side effects of the active solvent without inhibiting its haze removal function, up to 30 weight percent of other chemical compound or compounds may be present in the bath without departing from the scope or spirit of this invention. Such compounds are classified herein under the label "third component", and work primarily as a diluent for the purpose of this invention without causing detrimental effect. Naturally, water should be avoided from the bath composition, and it is preferred that third component or components be such that the overall bath constitute a homogeneous solution. Examples of third component include dimethyl sulfone, pyrrolidone, and N-methylacetamide.

The following examples are given for the purpose of illustrating this invention.

EXAMPLE 1

A boxful of hard-coated polarizing lenses which had been dyed developed haze during storage. All of the 600 lenses contained in the box developed about the same degree of haze which was clearly visible to the naked eyes. Ten (10) lenses were randomly sampled from the box and subjected to haze measurement according to ASTM D-10003-61. The haze values were determined to be 9.4, 9.0, 10.4, 9.8, 11.4, 11.0, 8.2, 11.6, 7.2 and 8.6%, averaging to 9.7%.

These ten lenses were immersed in a bath prepared by mixing iso-propanol, ethylene glycol and glycerol in a volume ratio of 1:2:2. After 10 minutes of immersion at 150° F., the lenses were taken out of the bath and thereafter rinsed with water and dried. The haze value dropped to less than 3% in all of the samples. The values of the overall light transmission of the sampled lenses in the visible spectral region did not change significantly during this haze removal process, the largest change being about 1% drop in said transmission. This indicated that there was no appreciable bleaching of the color from the lenses. There was no indication of other adverse effects such as swelling of the lenses.

EXAMPLE 2

Several lenses were randomly sampled from the box mentioned in Example 1 and immersed in a bath prepared by mixing anhydrous ethanol, ethylene glycol and glycerol in a volume ratio of 1:2:2. Ten (10) minutes immersion at about 145° F. cleared the haze for all the samples, showing that the final haze values were all less than 3%. There was no appreciable color bleaching or swelling of the lenses.

EXAMPLE 3

Several lenses were randomly sampled from the box mentioned in Example 1 and immersed in a bath prepared by mixing n-butanol, ethylene glycol and glycerol in a volume ratio of 1:2:2. Ten (10) minutes immersion at 140° F. partially cleared the haze, but after 20 minutes of immersion at 140° F., haze was cleared to less than 3% for all of the samples. There was no appreciable color bleaching or swelling of the lenses.

EXAMPLE 4

A polarized sheet of cellulose acetate butyrate was placed in an environmental chamber simulating a high-humidity, high ambient temperature condition and kept there until the sheet developed a conspicuous haze. The sheet was taken out of the environmental chamber and immersed in a bath prepared by mixing iso-propanol and butyl phthalate in a volume ratio of 1:1. After 20 minutes of immersion at 145° F., the haze was cleared from 13.2% to 4.8% haze value.

The above descriptions and particularly the examples are set forth by way of illustration only. Many other variations and modifications thereof will be apparent to those skilled in the art and can be made without departing from the spirit and scope of the invention herein set forth.

We claim:

1. A method of removing haze from plastic articles made with cellulose acetate butyrate, which comprises immersing said plastic articles in a substantially water-free bath composition at least 70 weight percent of which is a combination of an active solvent and a carrier solvent, said active solvent being methyl alcohol, ethyl alcohol, propyl alcohol, butyl alcohol or any mixture thereof, said carrier solvent being ethylene glycol, glycerol, tricresyl phosphate, butyl phthalate, or any mixture thereof, and the relative proportions between said active solvent and said carrier solvent being in the range of 90-5 and 10-95 weight percent, respectively.

2. A method according to claim 1 wherein the relative proportions between the active solvent and the carrier solvent are in the range of 80-10 and 20-90 weight percent, respectively.

3. A method according to claim 1 wherein the immersion is conducted at a bath temperature within the range of 120°-180° F.

4. A method according to claim 1 wherein the immersion is conducted at a bath temperature within the range of 130°-160° F.

5. A method according to claim 1 wherein the active solvent is propyl alcohol.

6. A method according to claim 1 wherein the active solvent is ethyl alcohol.

7. A method according to claim 1 wherein the carrier solvent is glycerol.

8. A method according to claim 1 wherein the carrier solvent is ethylene glycol.

9. A method according to claim 1 wherein the carrier solvent is a mixture of glycerol and ethylene glycol.

* * * * *